United States Patent Office 3,634,322
Patented Jan. 11, 1972

3,634,322
COMPOSITION OF MATTER COMPRISING AN EPOXY RESIN, DICYANDIAMIDE AND HEXA-METHYLENETETRAMINE
Peter Ruf and Ewald Forster, Binningen, Switzerland, assignors to Ciba Limited, Basel, Switzerland
No Drawing. Continuation-in-part of application Ser. No. 631,132, Apr. 17, 1967. This application Apr. 22, 1970, Ser. No. 30,979
Int. Cl. C08g 30/14
U.S. Cl. 260—47 EN          4 Claims

ABSTRACT OF THE DISCLOSURE

A heat-curable composition of matter which comprises (a) an epoxide compound having an epoxide equivalency greater than 1, (b) dicyandiamide as the curing agent and (c) hexamethylene tetramine as a cure accelerator. Such compositions are useful inter alia as molding compositions.

CROSS REFERENCES TO RELATED APPLICATIONS

This application is a continuation-in-part application of our copending application Ser. No. 631,132, filed Apr. 17, 1967 and now abandoned.

It is known that epoxide resins cure with dicyandiamide at elevated temperatures to give insoluble, crosslinked high molecular products. The cured products are distinguished by general good properties but especially by good light stability and outstanding adhesion to metals and many materials. However long periods at not less than 120° C. are necessary for gelling and curing.

The curing speed however even at temperatures of 160–180° C. does not suffice for the use of dicyandiamide as a curing agent for epoxide moulding compositions. When using larger quantities a strongly exothermic reaction as a rule occurs at cure temperatures of above 140° C., coupled with partial decomposition.

Admittedly the cure time can be shortened by adding larger quantities of accelerators, but the storage stability of such combinations is largely or completely lost. In most cases it is just because of its good storage stability that dicyandiamide is used as a curing agent for epoxide resins. It has now been found that the disadvantages described can be avoided if hexamethylene tetramine is used as an accelerator for the cure of epoxide resins with dicyandiamide.

Accordingly, the subject of the present invention are heat-curable mixtures which are suitable for the manufacture of prepregs, coatings, cast and moulded articles, and as moulding compositions, sinter powders and adhesives and the like, and which are characterised in that they contain (a) an epoxide compound having an epoxide equivalent greater than 1, (b) a curing amount of dicyandiamide as the curing agent and (c) hexamethylene tetramine as a cure accelerator.

The epoxide compounds having an epoxide equivalency of greater than 1 which are contained in the curable mixtures according to the invention contain, calculated relative to the average molecular weight, $x$ epoxide groups, where $x$ is an integer or fraction greater than 1.

It is known that in the usual methods for the manufacture of polyepoxide compounds technical mixtures of compounds of molecular weight differing from one another are generally obtained, with the mixtures furthermore containing a proportion of compounds whose terminal epoxide groups have been partially hydrolysed. The analytically determined epoxide equivalent value of such technical mixtures therefore does not have to be an integer having a value of at least 2, but must in any case be greater than 1.0.

Possible epoxide compounds of the nature defined above are for example: alicyclic polyepoxides, such as vinylcyclohexene dioxide, limonene dioxide, dicyclopentadiene dioxide, ethylene glycol-bis(3,4-epoxytetrahydrodicyclopentadien-8-yl)ether, 3,4 - epoxytetrahydrodicyclopentadien-8-yl)glycidyl ether, epoxidised polybutadienes or copolymers of butadiene with ethylenically unsaturated compounds such as styrene or vinyl acetate; compounds having two epoxycyclohexyl residues such as diethylene glycol-bis-(3,4-epoxycyclohexane-carboxylate), bis - 3,4-(epoxycyclohexylmethyl)succinate, 3,4 - epoxy-6-methyl-cyclohexylmethyl - 3,4 - epoxy - 6 - methyl-cyclohexanecarboxylate and 3,4-epoxyhexahydrobenzal-3,4-epoxy-cyclohexane-1,1-dimethanol.

Further possibilities are polyglycidyl esters such as are obtainable by reacting a dicarboxylic acid or cyanuric acid with epichlorhydrin or dichlorhydrin in the presence of alkali. Such polyesters can be derived from aliphatic dicarboxylic acids such as succinic acid or adipic acid and especially from aromatic dicarboxylic acids such as phthalic acid or terephthalic acid. There may for example be quoted diglycidyl adipate, diglycidyl phthalate and triglycidyl isocyanurate.

Further possibilities are basic polyepoxide compounds such as are obtained by reaction of primary or secondary aliphatic or aromatic diamines such an aniline, toluidine, 4',4'-diaminodiphenylmethane 4',4' - di - (mono-methyl-amino)-diphenylmethane or 4,4'-diaminodiphenylsulphone with epichlorhydrin in the presence of alkali.

Polyglycidyl ethers such as are obtainable by the etherification of a dihydric or polyhydric alcohol or diphenol or polyphenol with epichlorhydrin or dichlorhydrin in the presence of alkali are preferably used. These compounds may be derived from glycols such as ethylene glycol, diethylene glycol, triethylene glycol, 1,3-propylene glycol, 1,4-butanediol, 1,5-pentanediol, 1,6-hexanediol, 2,4,6-hexanetriol, glycerine and especially from diphenols or polyphenols such as resorcinol, pyrocatechol, hydroquinone, 1,4-dihydroxynaphthalene, bis(p-hydroxyphenyl)-methane, bis(p - hydroxyphenyl)methylphenylmethane, bis(p - hydroxyphenyl)tolylmethane, 4,4' - dihydroxydiphenyl, bis(p-hydroxyphenyl)sulphone and especially bis-(p-hydroxyphenyl)dimethylmethane.

There may especially be quoted the polyglycidyl ethers of bis(p-hydroxyphenyl)dimethylmethane (bisphenol A) which correspond to the average formula

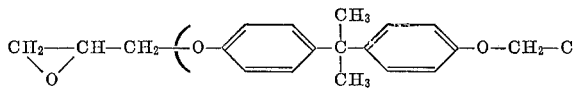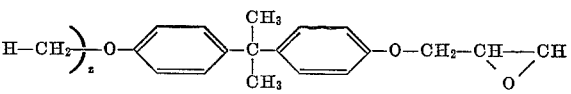

wherein $z$ denotes an integral or fractional small number having a value of 0 to 2.

Furthermore mixtures of two or more of the above-mentioned epoxide resins may be used.

The curable mixtures of the invention may furthermore contain suitable plasticisers such as dibutyl phthalate, dioctyl phthalate or tricresyl phosphate, inert organic solvents or diluents or so-called active diluents such as especially monoepoxides, for example butylglycid or cresylglycid.

Furthermore the curable mixtures of the invention may before cure be mixed, at any stage, with extenders for epoxy resins such as asphalt, coal tar, bituman or other usual additives such as fillers, pigments, dyestuffs, flame-retardant substances, mould release agents and the like.

The curable mixtures of the invention may in the unfilled or filled state, optionally in the form of solutions or emulsions, serve as laminating resins, impregnating resins, paints, lacquers, dip-coating resins, casting resins, sealing compositions and putties, floor covering compositions, embedding and insulation compositions for electrotechnology, adhesives and the like, and also for the manufacture of such products.

Because of their outstanding storage stability the hot-curable mixtures of the invention are particularly suitable for the manufacture of hot-curable so-called single component systems which can be sold as commercial products of practically unlimited storage stability at normal room temperature. Such single component systems are for example prepregs, sinter powders, single component adhesives and especially moulding compositions.

In order to manufacture prepregs porous two-dimensional materials such as woven fabrics, braids, fibre mats, fibre fleeces or rovings of organic or inorganic fibrous substances, for example paper, asbestos paper and especially glass fibre mats or glass fibre woven fabrics are impregnated with a solution which contains the epoxy resin, curing agent and accelerator dissolved in a usual organic solvent for impregnating resins, such as acetone, methyl ethyl ketone, ethylene glycol monomethyl ether or toluene, and the solvent is subsequently evaporated by a heat treatment. The so-called "prepregs" made in this way are storage-stable and can be moulded into laminates or profiles and the like by reaction of heat and under pressure and with shaping.

In order to manufacture the ready-to-use sinter powders or molding compositions, fillers or reinforcing agents and/or pigments and/or materials which confer thixotropy are additionally incorporated into the resin and curing agent components. Suitable fillers for sinter powders are finely powdered substances such as titanium dioxide (rutile) or $SiO_2$ powder. A suitable additive for conferring thixotropy is for example the finely divided silicon dioxide of large internal surface commercially available under the registered tradename "Aerosil."

Suitable fillers or reinforcing agents for moulding compositions are fibrous or powdery inorganic or organic substances. The following may be quoted as inorganic fillers: quartz flour, hydrated aluminium oxide, mica, aluminium powder, iron oxide, ground dolomite, powdered chalk, gypsum, slate flour, unburnt kaolin (bolus), burnt kaolin (registered trade name "Molochit"); as organic fillers there may be quoted: wood flour and cellulose.

Inorganic fibrous substances such as for example glass fibres, asbestos fibres or organic natural or synthetic fibres such as cotton, polyamide, polyester or polyacrylonitrile fibres may be employed as reinforcing agents.

The amount of fillers or reinforcing agents in the molding compositions is generally 40 to 190% of the amount of epoxy resin employed; it depends on the nature of the fillers and on the desired properties of the moulding composition or of the mouldings made therefrom.

The moulding compositions may be manufactured by various methods in a manner which is in itself known.

For example the epoxy resin and possible further soluble additives present in the moulding composition, for example the curing agent, may be dissolved in a solvent such as acetone or dichlorethane and the resulting solutions of low viscosity may be mixed with the remaining insoluble components such as fillers, pigments and others.

However it is also possible to manufacture a paste by warming the epoxy resin and/or by adding a small quantity of a suitable liquid to the epoxy resin and possible other additives, and to mix the remaining moulding composition components into this paste.

Finally it is also possible to dispense entirely with the addition of solvents and to mix the epoxy resin at room temperature or only slightly above this temperature, in the solid state, with the remaining components by the so-called dry process in a suitable mixing device, for example a ball mill.

The choice of the mixing process depends above all on the fillers or reinforcing agents used. The wet mixing process is preferably for fibrous reinforcing agents because in this process the original length of the fibres is largely preserved.

If desired, the moulding compositions of the invention can be converted to forms suitable for filling compression moulds or the like, such as lozenges, tablets or granules.

Admittedly epoxy resin moulding compositions based on conventional epoxy resins, for example polyglycidyl ethers of bisphenol A, and amine curing agents, such as especially p,p'-diaminodiphenylmethane, are known. The mouldings manufactured therefrom are distinguished by good electrical and mechanical properties. However they suffer from the disadvantage of a significantly lower storage stability compared to the known moulding compositions based on phenolic resins, urea resins or melamine resins. For this reason it is frequently only possible to transport them from the moulding composition manufacturer to the fabricator in special cold containers, above all during the warm part of the year. The moulding works generally have special cold chests for storing the moulding compositions before moulding. The mouldings made from these moulding compositions furthermore have very poor light stability, which frequently renders their use impossible.

It is therefore surprising that storage-stable, easily mouldable and electrically particularly high grade moulding compositions, which furthermore have a significantly better light stability than the known moulding compositions based on polyglycidyl ethers of bisphenol A as well as p,p'-diaminodiphenylmethane as the curing agent, are obtained if according to the invention dicyandiamide is used as a curing agent and is accelerated by hexamethylene tetramine.

In the following examples the following two methods were used to assess the ease of flow of the moulding compositions:

(1) DETERMINATION OF "CUP RATING"

In this test method which we developed ourselves, 70 g. of the moulding composition are introduced into a cup mould according to DIN 53,465 which has been heated to 165° C., and a test specimen is moulded. The following determinations are carried out with the test specimen:

(a) If the test specimen shows no moulding flash, the mean height of the moulding;

(b) If the test specimen shows a moulding flash, the amount of the moulding flash.

A fully moulded cup without moulding flash is given the cup rating 7. If under the moulding pressure used the flow of the moulding composition does not suffice to fill the mould completely, the mean height of the resulting moulding is measured on a uniformly divided scale, whose zero point is at the bottom of the cup and whose scale division 7 coincides with the upper edge of the fully moulded cup. Thus for example a cup rating of 3½ corresponds to a moulded article which only half fills the cup mould.

In the case of test specimens which have a moulding flash the following assessment is carried out: the flash is removed and weighed. The cup rating (BN) is calculated according to the formula $$BN = 7 + \frac{\text{Weight of moulding flash in g.}}{2}$$

The cup rating scale has a top limit of cup rating 10 corresponding to a moulding flash weight of 6 g. or more.

(2) DETERMINATION OF CLOSING TIME ACCORDING TO DIN STANDARD 53,465

The moulding composition is introduced into a cup mould according to DIN 53 465 heated to 165° C. and the mould is closed. The time from beginning to introduce the moulding composition to the beginning of the pressure increase should here be 15 seconds ±1 second. The speed of the press piston until it comes to rest on the moulding composition should be 2 cm. per second ±0.5 cm./second.

The closing time measured with a stopwatch, is taken as the time from the beginning of the pressure increase, observed on the monometer of the press, to when the press piston stops, as observed on an indicator device with pointer recorder fixed to the press, or on a guage.

In the following examples the percentages denote percentages by weight.

EXAMPLE 1

In this example a known moulding composition based on a bisphenol A epoxy resin and p,p′-diaminodiphenylmethane as the curing agent is compared with a moulding composition according to the invention which uses dicyandiamide + hexamethylene tetramine as the curing agent in place of p,p′-diaminodiphenylmethane. It is furthermore shown that the use of dicyandiamide alone as the curing agent does not result in any usable moulding compositions.

The following epoxy resins A and B were used to manufacture the moulding compositions:

Epoxy resin A

Polyglycidyl ether which is liquid at room temperature, which was obtained by condensation of bis(p-hydroxyphenyl) dimethylmethane (bisphenol A) with epichlorhydrin in the presence of alkali, and which has an epoxide content of 5.3 epoxide equivalents per kg. as well as a viscosity of 9,000–13,000 cp. at 25° C.

Epoxy resin B

Polyglycidyl ether which is solid at room temperature, which was obtained by condensation of bis(p-hydroxyphenyl) dimethylmethane with epichlorhydrin in the presence of alkali, and which has an epoxide content of 2.1 epoxide equivalents per kg. and a density of 1.188 g./cm.$^2$ at 20° C.

The moulding compositions were manufactured as follows:

Moulding composition I 100 g. of epoxy resin A, 55.5 g. of epoxy resin B, 21.5 g. of dicyandiamide, 7.5 g. of zinc stearate and 150 g. of burnt kaolin (registered trade name "Molochit") were thoroughly mixed in a double bowl kneader heated to 75° C. After 15 minutes 150 g. of 6 mm. long glass fibres were scattered into the mixture a little at a time and thoroughly distributed for 15 minutes. Thereafter 3 g. of hexamethylene tetramine were added and well mixed with the material being kneaded. After 24 hours the material was ground.

Moulding composition II 100 g. of epoxy resin A, 55.5 g. of epoxy resin B, 34 g. of p,p′-diaminodiphenylmethane, 7.5 g. of zinc stearate, and 150 g. of burnt kaolin (registered trade name "Molochit") were thoroughly mixed in a double bowl kneader heated to 75° C. 150 g. of 6 mm. long glass fibres were added a little at a time to the uniform mixture and were thoroughly distributed for 15 minutes. The material was ground after 24 hours.

The freshly prepared known moulding composition II had a cup rating of 7½ at a pressure of 150 kg./cm.$^2$ and a press temperature of 180° C., and a closing time of 7 seconds. After 1 day's storage at 50° C. its ease of flow had, in contrast to the moulding composition I of the invention, however greatly suffered (cup rating 3, closing time 50 seconds).

The Table 1 which follows compares the properties of the moulding composition I of the invention and of the known moulding composition II as well as the properties of the mouldings made therefrom.

It can be seen from the comparison that the moulding composition I of the invention, in addition to its surprisingly high storage stability, has the further advantage that the mouldings made therefrom have a very much better light stability.

TABLE 1

| Property | Test method | Unit | Moulding composition I | Moulding composition II |
| --- | --- | --- | --- | --- |
| Cup rating, 150 kg./cm.$^2$ | Internal | Rating | 10 | 10 |
| Closing time, 150 kg./cm.$^2$ | DIN 53,465 | Seconds | 2 | 4 |
| After storage test of 24 hrs. at 50° C.: | | | | |
| Cup rating, 150 kg./cm.$^2$ | Internal | Rating | 10 | 1 |
| Closing time, 150 kg./cm.$^2$ | DIN 53,465 | Seconds | 12 | 100 |
| Flexural strength | VSM 77,103 | Kg./mm.$^2$ | 12.2 | 13.1 |
| Impact strength | VSM 77,105 | Cm.kg./cm.$^2$ | 10.5 | 8.0 |
| Martens dimensional heat stability | DIN 53,458 | °C | 115 | 102 |
| Loss factor tg δ (50 cycles/second, 20° C.) | VDE 0303 | | 0.006 | 0.006 |
| Dielectric constant ε (50 cycles/second, 20° C.) | | | 5.5 | 5.2 |
| Specific resistance: | | | | |
| Dry | VDE 0303 | Ohm ×cm | 6×10$^{15}$ | 4×10$^{15}$ |
| After 24 hrs. in H$_2$O at 23° C | | Ohm×cm | 2×10$^{15}$ | 2×10$^{15}$ |
| Light stability (Xenotest, 100 hrs. duration) [1] | | | (2) | (3) |

[1] In the Xenotest partially masked samples are irradiated with a xenon arc lamp in a light fastness and weathering test equipment which is sold under the name of "Xenotext 150" by Messrs. Quarzlampengesellschaft GmbH., Hanau, Germany.
[2] Very slight discolouration.
[3] Strong discolouration.

The moulding conditions were uniformly 180° C. and 150 kg./cm.$^2$ for all test specimen. The moulding times were as follows:

Mins.
VSM-rods (determination of mechanical properties) __ 4
DIN-rods (determination of Martens dimensional stability) _____ 8
Sheets, 2 mm. (determination of electrical properties) _ 3

A moulding composition manufactured without the addition of hexamethylene tetramine but otherwise entirely analogously to the moulding composition 1 of the invention proved to be technically unusable since it could not be moulded even with a moulding time of 15 minutes under otherwise identical press conditions (150 kg./cm.$^2$, 180° C.).

EXAMPLE 2

Two moulding compositions according to the invention were manufactured, with the amount of the added accelerator as well as the nature of the added fillers in the formulations being varied:

Moulding composition III

A solution of 300 g. of epoxy resin A according to Example 1, in 150 g. of acetone, was mixed with the following additives in a double bowl kneader: 42 g. of dicyandiamide, 10 g. of hexamethylene tetramine, 9 g. of calcium stearate, and 360 g. of burnt kaolin (registered trade name "Molochit"). After 15 minutes duration of kneading 120 g. of 6 mm. long glass fibers were added and the composition mixed for a further 15 minutes. The kneaded material was subsequently dried for 3 hours in a vacuum cabinet at 55° C. and the dried material was then ground.

Moulding composition IV

A solution of 300 g. of epoxy resin A according to example 1, in 150 g. of acetone, was mixed with the following additives in a double bowl kneader: 42 g. of dicyandiamide, 7 g. of hexamethylene tetramine, 9 g. of zinc stearate and 360 g. of talc powder.

After 15 minutes duration of kneading 120 g. of 6 mm. long glass fibers were added a little at a time and mixing continued for a further 15 minutes. The kneaded material was thereafter dried for 3 hours in a vacuum cabinet at 55° C. and the dried material was ground.

The Table II which follows lists the properties of moulding compositions III and IV as well as the properties of the mouldings made therefrom: the conditions of moulding the test specimen were the same as in Example 1.

The test temperature was 180° C. in all cases. The results may be seen from Table III below.

TABLE III

| Hexamethylene tetramine, parts by weight | Stage | Experimental Series 1 [a] | Experimental Series 2 [b] |
|---|---|---|---|
| 0 | B-stage | 8.50 minutes | 6.42 minutes |
|   | C-stage | 8.75 minutes | 6.58 minutes |
| 2 | B-stage | 1.42 minutes | 1.58 minutes |
|   | C-stage | 1.50 minutes | 2.00 minutes |
| 4 | B-stage | 1.17 minutes | 1.25 minutes |
|   | C-Stage | 1.25 minutes | 1.75 minutes |

[a] 100 parts by weight of epoxy resin A+14.7 parts by weight of dicyandiamide.
[b] 100 parts by weight of epoxy resin C+7.0 parts by weight of dicyandiamide.

EXAMPLE 4

436 g. of epoxy resin A in accordance with Example 1 and 44 g. of triglycidyl isocyanurate (jointly as an approximately 90% strength solution in acetone), 104 g. of dicyandiamide, 15 g. of hexamethylene tetramine, 22 g. of zinc stearate and 946 g. of burnt kaolin (registered trade name "Molochit") were kneaded in a double bowl kneader for 15 minutes to give a uniform mixture. Thereafter the kneaded material was stored for 4 hours in a vacuum cabinet at 70–80° C. in order to remove the acetone and convert the mass to a state where it could be ground. After cooling the dried material was comminuted in a beater mill. The resulting moulding com-

TABLE II

| Property | Test method | Unit | Moulding composition III | Moulding composition IV |
|---|---|---|---|---|
| Flexural strength | VSM 77, 103 | Kg./mm.$^2$ | 10.6 | 6.2 |
| Impact strength | VSM 77, 105 | Cm.kg./cm.$^2$ | 4.0 | 13.5 |
| Notched impact strength | VSM 77, 105 | Cm.kg./cm.$^2$ | 5.6 | 17.1 |
| Martens dimensional heat stability | DIN 53, 458 | °C | 110 | 109 |
| Loss factor tg δ (50 cycles/second, 20° C.) | VDE 0303 |  | 0.008 | 0.012 |
| Dielectric constant ε (50 cycles/second, 20° C.) |  |  | 5.3 | 5.1 |
| Specific resistance: |  |  |  |  |
| Dry | VDE 0303 | Ohm×cm | 3.4×10$^{15}$ | 3.7×10$^{15}$ |
| After 24 hrs. in H$_2$O, 23° C. |  | Ohm×cm | 5.7×10$^{14}$ | 5.0×10$^{14}$ |

EXAMPLE 3

The accelerating effect of adding increasing quantities of hexamethylene tetramine to curable mixtures containing an epoxy resin and dicyandiamide as the curing agent was established in the following cure time test:

The test is carried out on a heatable chromed steel plate of about 11 cm. diameter (obtainable from Messrs. Elektro-Physik, Cologne). This electrically heated metal plate can be set exactly to a desired test temperature by means of a temperature regulator or rheostat. The temperature is read off on a thermometer which rests in a radial bore and whose mercury bulb is in the centre of the plate.

The heating plate is set to the desired test temperature (for example 180° C.) and 1.0 g. of the resin/curing agent mixture is placed on the centre of the heating plate and the stopwatch is started. The mixture is distributed over an area of about 4 x 4 cm. with the aid of a 15 mm. wide, approx. 20 cm. long, metal spatula, and is constantly spread over the plate surface by about 40 strokes of the spatula per minute.

The time until filament pulling starts is recorded as the "B-stage time" and the instant at which no further filaments occur is described as the "C-stage time."

Two series of experiments were carried out with the following epoxy resins:

(1) Epoxy resin A according to Example 1.

(2) Epoxy resin C: polyglycidyl ether which is solid at room temperature, obtained by condensation of bis(p-hydroxyphenyl) dimethylmethane with epichlorhydrin in the presence of alkali and having an epoxide content of 2.5 epoxide equivalence per kg.

position was moulded for 8 minutes at 150° C. and at a pressure of 150 kg./cm.$^2$. The test specimen had the following properties:

Martens DIN 53458 dimensional heat stability—97° C.
Flexural strength DIN 53452—704 kg./cm.$^2$
Impact strength DIN 53453—3.8 cm. kg./cm.$^2$
Tracking resistance VDE 0303 stage—KA2

EXAMPLE 5

343 g. of epoxy resin A in accordance with Example 1 and 86 g. of triglycidyl isocyanurate (jointly as an approximately 85% strength solution in acetone), 111 g. of dicyanidamide, 15 g. of hexamethylene tetramine, 22.5 g. of zinc stearate and 946 g. of burnt kaolin (registered trade name "Molochit" were kneaded in a double bowl kneader for 15 minutes to give a uniform mixture. Thereafter the kneaded material was stored for 4 hours in a vacuum cabinet at 70–80° C. in order to remove the acetone and to convert the material to a state where it could be ground. After cooling the dry material was comminuted in a beater mill.

The moulding composition so obtained was moulded for 8 minutes at 150° C. and a pressure of 150 kg./cm.$^2$. The test specimen showed the following properties:

Martens dimensional heat stability, DIN 53458—103° C.
Flexural strength DIN 53452—660 kg./cm.$^2$
Impact strength DIN 53453—3.5 cm. kg./cm.$^2$
Tracking resistance VDE 0303 stage—KA2

EXAMPLE 6

250 g. of epoxy resin A according to Example 1 and 167 g. of triglycidyl isocyanurate (jointly as an approximately 81% strength solution in acetone), 123 g. of dicyandiamide, 15 g. of hexamethylene tetramine, 22.5 g. of zinc stearate and 946 g. of burnt kaolin (registered trade name "Molochit") were kneaded in a double bowl kneader for 15 minutes to give a homogeneous mixture. Thereafter the kneaded material was stored for 4 hours in a vacuum cabinet at 70–80° C. in order to remove acetone and convert the mass to a state where it could be ground. After cooling the dry material was comminuted in a beater mill.

The moulding composition so obtained was moulded for 8 minutes at 150° C. and a pressure of 150 kg./cm.² The test specimen exhibited the following properties:

Martens dimensional heat stability, DIN 53458—128° C.
Flexural strength DIN 53452—644 kg./cm.²
Impact strength DIN 53453—3.5 cm. kg./cm.²
Tracking resistance VDE 0303 stage—KA2

EXAMPLE 7

Four moulding compositions were manufactured with increasing amounts of the added accelerator.

Moulding composition V

A moulding composition was prepared according to moulding composition III, Example 2, except that 10 g. of hexamethylene tetramine were replaced by 12 g. of hexamethylene tetramine:

A solution of 300 g. of epoxy resin A in 150 g. of acetone was mixed with the following additives in a double bowl kneader: 42 g. of dicyandiamide, 12 g. of hexamethylene tetramine, 9 g. of calcium stearate and 360 g. of burnt kaolin (registered trade name "Molochit"). After 15 minutes duration of kneading 120 g. of 6 mm. long glass fibres were added and the composition mixed for a further 15 minutes. The kneaded material was subsequently dried for 3 hours in a vacuum cabinet at 55° C. and the dried material was then ground.

Moulding composition VI

A moulding composition was prepared in exactly identical manner as moulding composition V, except that 12 g. of hexamethylene tetramine were replaced by 15 g. of hexamethylene tetramine:

A solution of 300 g. of epoxy resin A in 150 g. of acetone was mixed with the following additives in a double bowl kneader: 42 g. of dicyandiamide, 15 g. of hexamethylene tetramine, 9 g. of calcium stearate and 360 g. of burnt kaolin (registered trade name "Molochit"). After 15 minutes duration of kneading 120 g. of 6 mm. long glass fibers were added and the composition mixed for a further 15 minutes. The kneaded material was subsequently dried for 3 hours in a vacuum cabinet at 55° C. and the dried material was then ground.

Moulding composition VII

A moulding composition was prepared in exactly identical manner as moulding composition V, except that 12 g. of hexamethylene tetramine were replaced by 21 g. of hexamethylene tetramine:

A solution of 300 g. of epoxy resin A in 150 g. of acetone was mixed with the following additives in a double bowl kneader: 42 g. of dicyandiamide, 21 g. of hexamethylene tetramine, 9 g. of calcium stearate and 360 g. of burnt kaolin (registered trade name "Molochit"). After 15 minutes duration of kneading 120 g. of 6 mm. long glass fibres were added and the composition mixed for a further 15 minutes. The kneaded material was subsequently dried for 3 hours in a vacuum cabinet at 55° C. and the dried material was then ground.

Moulding composition VIII

For comparison a moulding composition was prepared in exactly identical manner as moulding composition V, except that 12 g. of hexamethylene tetramine were replaced by 42 g. of hexamethylene tetramine so that the ratio by weight of dicyandiamide to hexamethylene tetramine was 1:1 according to the disclosure of U.S. Pat. No. 3,372,144, col. 9, Table I:

A solution of 300 g. of epoxy resin A in 150 g. of acetone, was mixed with the following additives in a double bowl kneader: 42 g. of dicyandiamide, 42 g. of hexamethylene tetramine, 9 g. of calcium stearate and 360 g. of burnt kaolin (registered trade name "Molochit"). After 15 minutes duration of kneading 120 g. of 6 mm. long glass fibers were added and the composition mixed for a further 15 minutes. The kneaded material was subsequently dried for 3 hours in a vacuum cabinet at 55° C. and the dried material was then ground.

The properties of the moulded articles made from the moulding compositions V, VI, VII and VIII are compared in the following Table IV:

TABLE IV

| Property | Testing method | Unit | Moulding compositions | | | |
|---|---|---|---|---|---|---|
| | | | V | VI | VII | VIII |
| Water absorption: | | | | | | |
| 24 hrs./20° C | VSM-rod (60 x 10 x 4 mm.) | Percent | 0.09 | 0.09 | 0.11 | 0.15. |
| 10 mins./100° C | do | do | 0.36 | 0.34 | 0.34 | 0.55. |
| Specific resistance: | | | | | | |
| Dry | VDE 0303 | Ohm×cm | $2.3 \cdot 10^{15}$ | $1.9 \cdot 10^{15}$ | $2.8 \cdot 10^{15}$ | $2.8 \cdot 10^{15}$. |
| After 24 hrs. in H₂O at 23° C. | VDE 0303 | Ohm×cm | $1.2 \cdot 10^{15}$ | $9.8 \cdot 10^{14}$ | $1.0 \cdot 10^{15}$ | $4.1 \cdot 10^{12}$. |
| Colour after moulding | | | Colourless | Colourless | Light yellowish. | Yellow. |

As can be seen from this comparison the moulded article of the moulding composition VIII, which contains dicyanidiamide and hexamethylene tetramine in equal amounts, is not colourless and has not so good mechanical and dielectrical properties as the moulded articles of moulding compositions V and VI.

What is claimed is:

1. A heat-curable composition of matter which comprises (a) an epoxide compound having on average more than one 1,2-epoxide group per molecule, (b) a curing amount of dicyandiamide as the curing agent and (c) hexamethylene tetramine as a cure accelerator, said hexamethylene tetramine being used in an amount no more than about 40% by weight of dicyandiamide (b).

2. A composition according to claim 1, wherein the epoxide compound (a) is a polyglycidyl ether of a polyphenol.

3. A composition according to claim 2, wherein the epoxide compound (a) is a polyglycidyl ether manufactured by condensation of bisphenol A with epichlorhydrin in the presence of alkali.

4. A moulding composition according to claim 1, wherein the epoxide compound (a) consists of a mixture of (1) a polyglycidyl ether of a polyphenol and (2) triglycidyl isocyanurate.

References Cited

UNITED STATES PATENTS

| | | | |
|---|---|---|---|
| 3,200,172 | 8/1965 | Renner | 260—47 EPCN |
| 3,372,144 | 3/1968 | Drucker | 260—2 EPCN |
| 3,397,156 | 8/1968 | Lopez et al. | 260—47 EPCN |
| 3,397,157 | 8/1968 | Holmes | 260—47 EPCN |
| 3,351,673 | 11/1967 | Price | 260—830 TW |
| 3,351,674 | 11/1967 | Masters | 260—830 TW |

OTHER REFERENCES

Chemical Abstracts, vol. 63, by Tolsdorf (p. 5836d), 1965.

WILLIAM H. SHORT, Primary Examiner

T. E. PERTILLA, Assistant Examiner

U.S. Cl. X.R.

117—161 ZB; 161—184, 185; 260—2 N, 9 R, 28, 30.2, 30.6 R, 31.8 E, 37 EP, 77.5 R, 78.4 EP, 83.5, 84.7, 94.6, 830 TW, 835, 836